June 26, 1956  A. L. LE FEBVRE  2,752,179
TUBE AND SOCKET CONNECTION AND METHOD OF MAKING
Filed Jan. 26, 1951
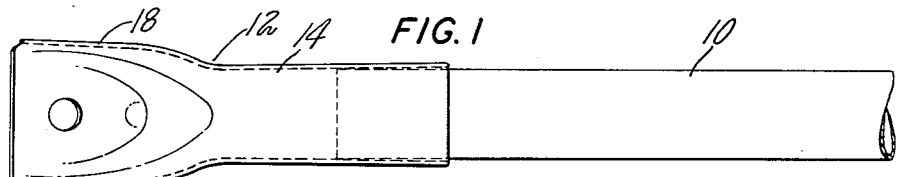
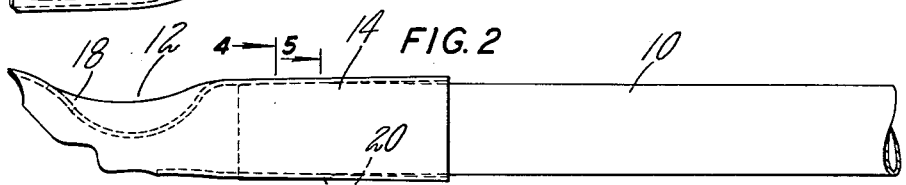
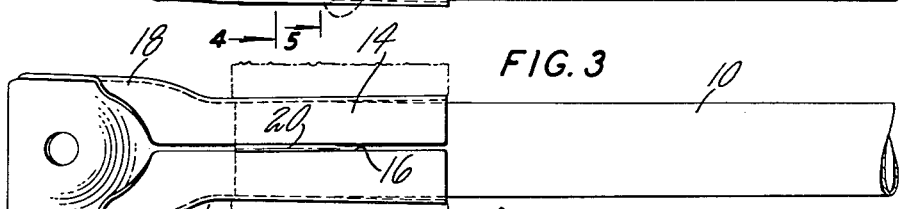
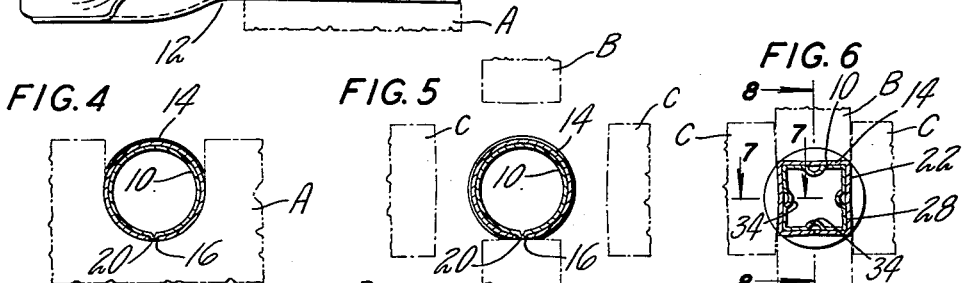
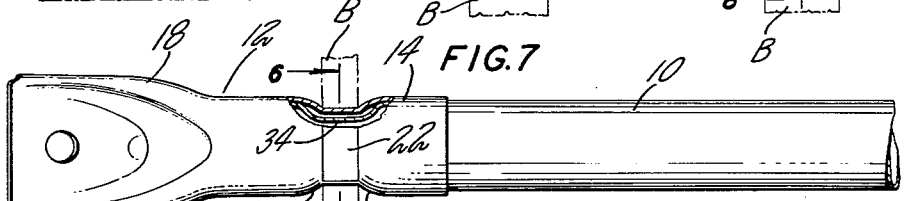
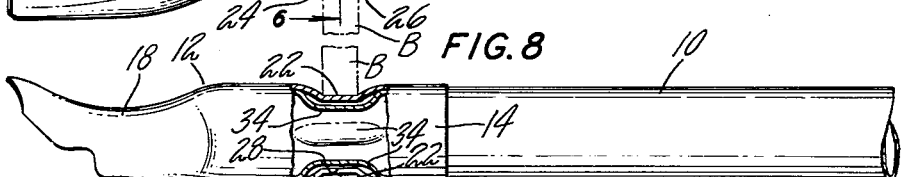
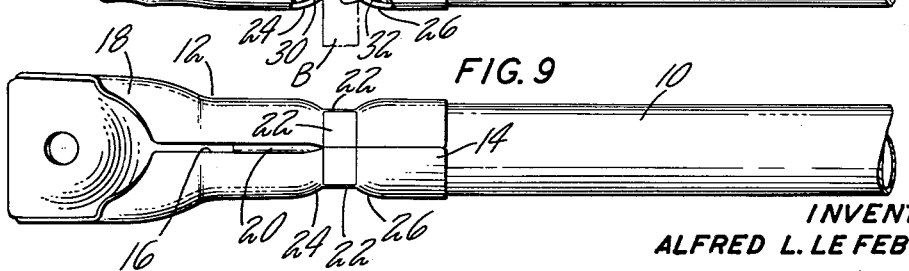
INVENTOR
ALFRED L. LE FEBVRE
BY
ATTORNEY United States Patent Office 2,752,179
Patented June 26, 1956

2,752,179

TUBE AND SOCKET CONNECTION AND METHOD OF MAKING

Alfred L. Le Febvre, Windsor, Conn., assignor to The Fuller Brush Company, Hartford, Conn., a corporation of Connecticut Application January 26, 1951, Serial No. 207,982

2 Claims. (Cl. 287—119)

The invention relates to a tube and socket member connection and to a method of making the same. While not necessarily so limited, the invention is particularly useful for connecting a tubular metallic handle with a socket member adapted for holding a mop or other implement to be controlled and moved by the handle. The Smith Patent No. 1,734,503 shows a socket member of the type herein referred to.

The general object of the invention is to provide a connection of the type mentioned and a method of making the same wherein the socket member is rigidly connected with the tube so as to be permanently and rigidly held to prevent relative rotative or longitudinal movement.

In the drawing I have shown in detail a preferred embodiment of the structural features of the invention and a preferred method of making the same, but it will be understood that various changes may be made from the construction and the method shown, and that the drawing is not to be construed as defining or limiting the scope of the invention, the claims forming a part of this specification being relied upon for that purpose.

Of the drawing:

Fig. 1 is a top view of the socket member with the front portion of the tube partly inserted therein.

Fig. 2 is a side view of the parts shown in Fig. 1, but with the tube fully inserted in the socket member.

Fig. 3 is a bottom view of the parts shown in Fig. 2, this view also schematically showing a holder for the socket member.

Fig. 4 is a transverse sectional view taken along the line 4—4 of Fig. 2.

Fig. 5 is a transverse sectional view taken along the line 5—5 of Fig. 2, this view also schematically showing tools for deforming the socket member and the tube.

Fig. 6 is a view similar to Fig. 5 but showing the socket member and handle after the tools have been moved relatively inwardly to effect deforming, this view being taken along the line 6—6 of Fig. 7.

Fig. 7 is a top view of the completed connection, but with a portion thereof shown in section along the line 7—7 of Fig. 6.

Fig. 8 is a side view of the parts shown in Fig. 7, but with a portion thereof shown in section along the line 8—8 of Fig. 6.

Fig. 9 is a bottom view of the parts shown in Figs. 7 and 8.

Figs. 7, 8 and 9 of the drawing show a completed connection involving the mechanical features of the invention. The said connection, for convenience and without any intended limitation, will be described as located in the position shown. It will be understood that such terms as "horizontal," "vertical," "upper," "lower" and the like are to be understood as merely defining the relationship of the parts.

The connection includes a metallic tube 10 constituting a handle and a connected socket member 12. The tube 10 initially has a generally cylindrical shape, the metal of the tube being relatively thin. The socket member 12 is formed of sheet metal preferably thicker than that of the tube and the rear portion of the socket member is bent to provide a socket 14 which initially has a generally cylindrical shape. While the socket is generally cylindrical, it is nevertheless slightly tapered as shown in Figs. 1 to 3, its walls converging toward the front. The internal diameter of the socket at the smaller front end thereof is smaller than the external diameter of the tube and the internal diameter of the socket at the larger rear end thereof is larger than the external diameter of the tube. The longitudinal edges of the sheet metal of the socket are initially spaced apart at the bottom throughout their length so that a longitudinal slot 16 is provided between them. The front portion 18 of the socket member is shaped or bent so as to be adapted to engage an implement to be controlled and moved by the handle. As concerns the front portion 18 of the socket member, a somewhat similar construction is shown in the aforesaid Smith patent.

The handle or tube 10 and the socket member 12 are initially assembled in the relative positions shown in Fig. 1 with the front portion of the tube partly inserted in the socket. The tube is inserted to the extent permitted by the taper of the socket without distortion of the tube.

After the parts have been initially assembled in the relationship shown in Fig. 1, they are relatively moved longitudinally to the positions shown in Figs. 2 and 3, the front portion of the tube being forced into the tapered socket. The initial relative movement to the positions shown in Fig. 1 may be combined with the additional relative movement to the positions shown in Figs. 2 and 3. Preferably, the socket is positioned within a holder such as A as shown in Figs. 3 and 4, this holder preventing the socket from spreading as the tube is forced into it. As the front end portion of the tube enters the forward portion of the tapered socket, the tube diameter is reduced and the surplus metal bulges or is folded outwardly or downwardly within the slot 16 to form a short rib or bead 20 within the front portion of the socket. The sides of the said outwardly folded rib or bead are in firm engagement with the sides of the slot.

The rib 20 and the slot 16 serve to prevent any relative rotative movement between the tube and the socket. The tube is also so engaged with the socket that relative longitudinal movement is prevented. The engagement which holds the tube against longitudinal movement cooperates with the rib 20 and the slot 16 to hold the tube and the socket in fixed relationship with each other. Preferably, the engagement between the tube and the socket which prevents longitudinal movement is such that it serves in cooperation with the rib to also prevent relative rotative movement. The said engagement between the tube and the socket preferably includes the provision on the socket of a short zone having a shape different from the generally cylindrical shape thereof and also includes a short zone on the tube within the differently shaped zone of the socket and having a different shape fitting the said differently shaped socket zone. The last said engagement and the method of effecting it will now be described in detail.

The assembly as shown in Figs. 2, 3 and 4 is placed in a suitable machine having a plurality of longitudinally narrow tools relatively movable inwardly and outwardly and positioned to engage the socket of the socket member at a longitudinally short zone of the periphery thereof. The said zone is between and spaced from the ends of the socket and is at the rear of the rib 20. The tools are so shaped and related that their inner faces define a polygon when the tools reach their relative innermost positions. Preferably, there are four tools B, B and C, C which define a square. As shown, the lower tool A is stationary and the other tools are movable with respect thereto. Preferably, the inner face of each tool is slightly beveled at the opposite sides of a longitudinal center line so that the front face is slightly convex.

As the tools B, B and C, C move from the position shown in Fig. 5 to the positions shown in Fig. 6, they engage and transversely press against the periphery of the socket 14 at the said longitudinally short zone thereof. As pressure is applied to the socket 14 by the said tools the tapered portion of the socket at the rear of the rib 20 is deformed so that it becomes cylindrical, this serving to completely close the slot 16 at the rear portion thereof and to bring the longitudinal edges of the metal at the rear portion of the socket into direct contact with each other. As pressure is further applied by the said tools the periphery of the socket is deformed at the said short zone thereof, being transformed from the shape of a hollow cylinder as shown in Fig. 5 to the shape of a hollow square as shown at 22 in Fig. 6. The sides of the square are approximately flat, but by reason of the slightly convex inner faces of the tools the walls of the square zone are slightly concave at the exterior and are slightly convex at the interior. The socket is cylindrical at the front and at the rear of the square zone 22, and as the result of the formation of the square zone 22 there are formed immediately adjacent transition zones 24 and 26 wherein the square shape gradually merges with the cylindrical shape.

The tools B, B and C, C are so related and are moved to such extents that, when the square zone is formed on the socket, the exterior corners of the square are approximately coincident with or in register with the exterior periphery of the cylindrical shape at the front and at the rear of the square zone. The total length of the exterior periphery of the square zone is therefore somewhat less than the total length of the exterior periphery of the initial cylindrical shape, the reduction in total peripheral length being attained by a slight thickening of the four walls of the square zone at the short zone 22.

As the result of the deforming of the socket to the shape of a hollow square at the zone 22, the handle or tube 10 is similarly deformed at a short zone 28 within the zone 22. At the said zone 28 the tube is transformed from the shape of a hollow cylinder as shown in Fig. 5 to the shape of a hollow square having generally flat sides as shown in Fig. 6. The tube 10 at the square zone 28 engages and fits the socket 14 at the square zone 22. The tube 10 is cylindrical at the rear of the square zone 28 and it is cylindrical at the front of the said zone except for the rib 18. As the result of the formation of the square zone 28, there are formed immediately adjacent transition zones 30 and 32 wherein the square shape gradually merges with the cylindrical shape. The exteriors of the last said transition zones 30 and 32 on the tube engage and fit the interiors of the transition zones 24 and 26 on the socket.

The total length of exterior periphery of the square zone 28 is less than the total length of the exterior periphery of the initial exterior cylindrical shape. As has been stated, the reduction in the total length of the periphery of the square zone 22 of the socket is attained by slightly thickening the four walls of the said zone, such thickening resulting in part from the fact that the said walls are supported at the inner faces thereof by the adjacent portions of the tube. However, the inner faces of the walls of the square zone 28 of the tube are without interior support and the said walls instead of being thickened are folded or bulged inwardly with resultant longitudinal ribs or beads 34, 34 at or near the centers of the said walls. The said ribs or beads 34, 34 are spaced inwardly from the sides of the substantially flat walls of the square at 22 on the socket. The slight convexity of the interior walls of the square zone of the socket probably assists in forming the inwardly projecting ribs or beads 34, 34.

As previously stated, the rib 20 and the slot 16 prevent relative rotative movement between the tube and the socket. The interengaging square zones 22 and 28 also prevent relative rotative movement between the tube and the socket. The interengaging transition zones 24, 26 and 30, 32 prevent relative longitudinal movement between the tube and the socket. Thus the tube and the socket are so connected as to prevent any relative movement whatsoever.

The invention claimed is:

1. The herein described method of making a tube and socket member connection which method comprises in combination, providing a metallic socket member including a socket having a generally cylindrical shape but nevertheless tapered with its smaller end at the front, the said socket having a longitudinal slot in the front portion thereof, providing a metallic tube having a cylindrical shape and having an external diameter smaller than the internal diameter of the socket at the larger rear end thereof and larger than the internal diameter of the socket at the smaller front end thereof, inserting the front portion of the tube forwardly into the socket to cause the forward portion thereof to be reduced in external diameter with the formation of an integral folded longitudinal rib which projects outwardly into and fits the said slot in the socket, and transversely pressing the socket at a short zone between and spaced from the ends thereof and at the rear of the said rib to deform the socket to a polygonal shape at the said zone and to form transition zones adjacent the ends of the said polygonally shaped zone wherein the polygonal shape merges with the cylindrical shape, the said transverse pressing of the socket to deform it as aforesaid also deforming the tube to form similar polygonally shaped and transition zones which respectively engage and fit the said zones of the socket.

2. A tube and socket member connection comprising in combination, a thin-walled sheet metal socket member having a rear section bent to form a generally cylindrical socket, the metal of the said socket having longitudinal edges which are substantially in contact with each other in the rear portion of the said socket and which are separated from each other in the front portion of the said socket so as to provide a longitudinal slot in the said front portion and the said socket having a short polygonally shaped zone in the said rear portion thereof adjacent the rear end of the slot and spaced forwardly from the rear end of the said rear portion which polygonally shaped zone has exterior faces that are outwardly exposed and has interior faces that are parallel to said exterior faces and the said socket having transition zones adjacent the ends of the polygonally shaped zone thereof wherein the polygonal shape merges with the generally cylindrical shape, and a metallic tube having its wall thinner than the metal of the socket and having a generally cylindrical shape, said tube having its front portion positioned within and fitting the socket of the socket member and having on its said front portion an outwardly projecting longitudinal rib which is a folded portion of the metal of the tube entered in the longitudinal slot in the front portion of the socket and which rib has permanent forced engagement with the edges of the said slot, the said tube also having a short polygonally shaped zone within said short polygonally shaped zone of the socket which polygonally shaped zone of the tube has exterior faces engaging and fitting the interior faces of the polygonally shaped zone of the socket member and has interior faces that are parallel to the last said exterior faces and the said tube further having transition zones adjacent the ends of the polygonally shaped zone thereof wherein the polygonal shape merges with the cylindrical shape which last said transition zones fit the said transition zones of the socket.

(References on following page)

References Cited in the file of this patent

UNITED STATES PATENTS

| | | | |
|---|---|---|---|
| 638,554 | Burton | Dec. 5, | 1889 |
| 1,329,479 | Savon | Feb. 3, | 1920 |
| 1,421,623 | Veeden | July 4, | 1922 |
| 1,678,640 | Hall | July 31, | 1928 |
| 1,734,025 | Zeibig | Oct. 29, | 1929 |
| 1,734,503 | Smith | Nov. 5, | 1929 |
| 1,765,651 | Bryant | June 24, | 1930 |
| 1,822,400 | Heeter | Sept. 8, | 1931 |
| 2,266,796 | Parker | Dec. 23, | 1941 |
| 2,335,414 | Hinrichs | Nov. 30, | 1943 |
| 2,350,582 | Booth | June 6, | 1944 |
| 2,417,350 | Conroy | Mar. 11, | 1947 |

FOREIGN PATENTS

| | | | |
|---|---|---|---|
| 12,409/28 | Australia | Aug. 23, | 1928 |